June 4, 1935.  C. B. HATHAWAY  2,003,688
POWER SUPPLY SYSTEM FOR ELECTRIC SHOVELS AND THE LIKE
Filed June 16, 1930   2 Sheets-Sheet 1
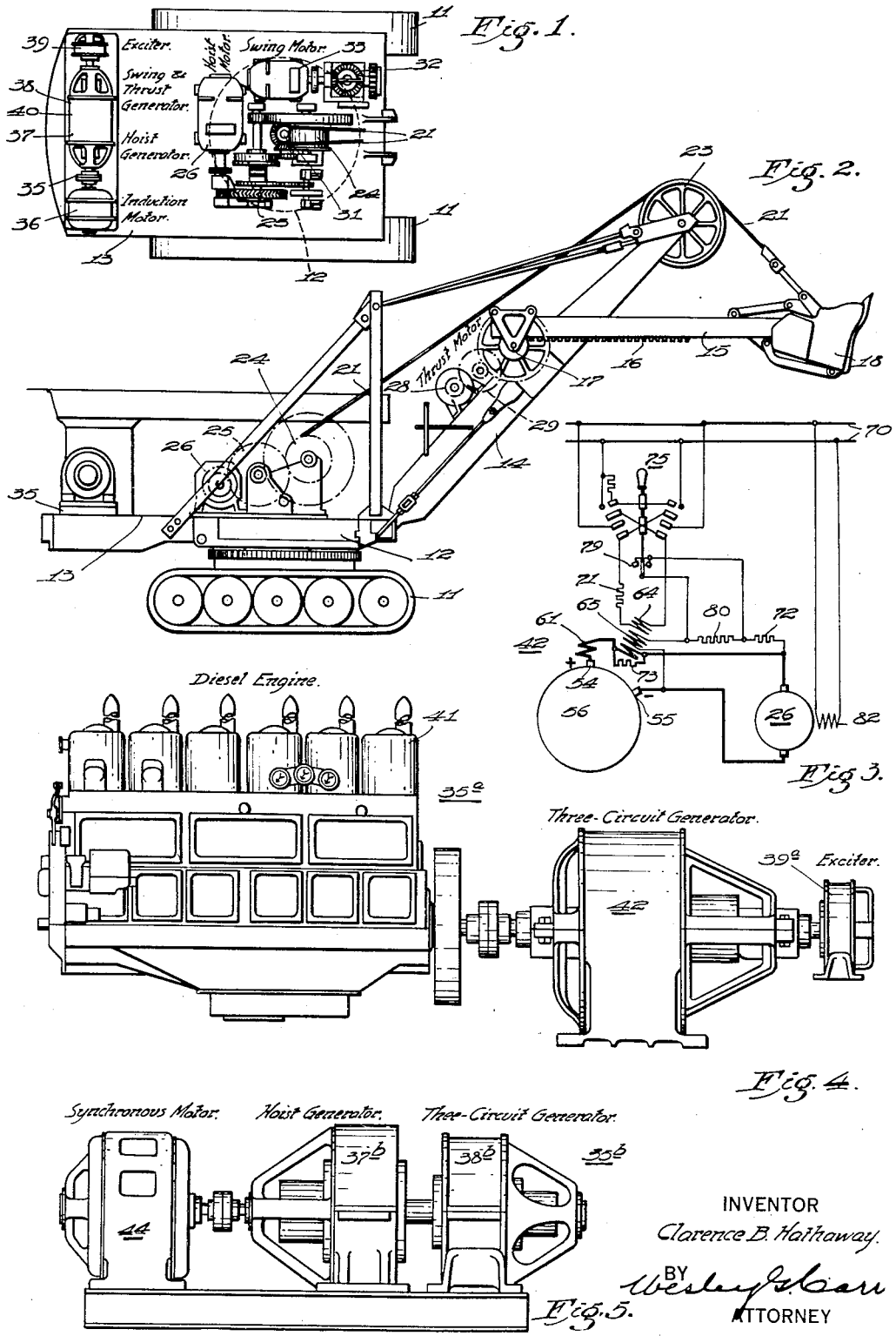
INVENTOR
Clarence B. Hathaway
BY
Wesley J. Carr
ATTORNEY June 4, 1935. C. B. HATHAWAY 2,003,688
POWER SUPPLY SYSTEM FOR ELECTRIC SHOVELS AND THE LIKE
Filed June 16, 1930 2 Sheets-Sheet 2
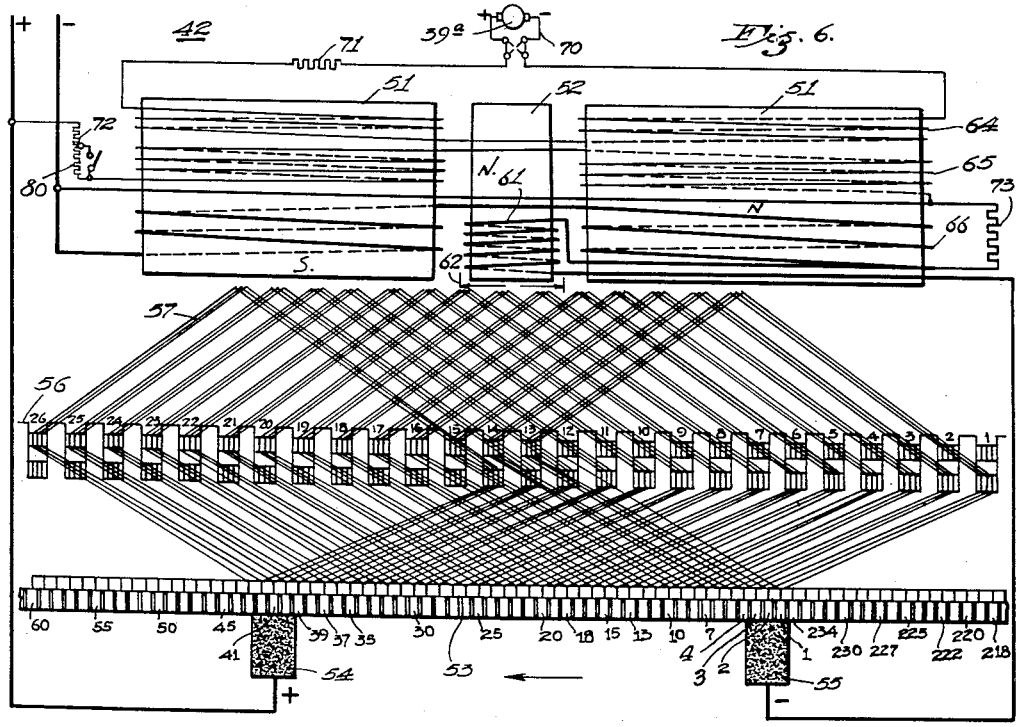
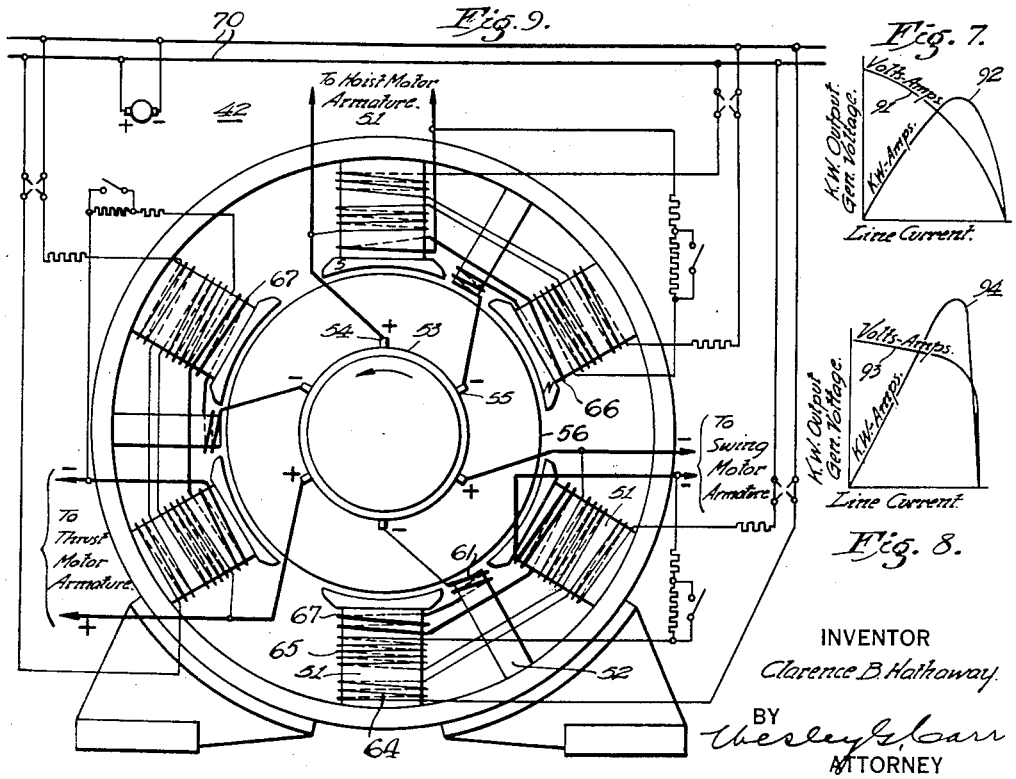
INVENTOR
Clarence B. Hathaway
BY
ATTORNEY Patented June 4, 1935

2,003,688

UNITED STATES PATENT OFFICE 2,003,688

POWER-SUPPLY SYSTEM FOR ELECTRIC SHOVELS AND THE LIKE

Clarence B. Hathaway, Wilkinsburg, Pa., assignor to Westinghouse Electric & Manufacturing Company, a corporation of Pennsylvania Application June 16, 1930, Serial No. 461,333

20 Claims. (Cl. 172—239)

My invention relates to electrically operated draglines or shovels, and it has particular relation to an electrical installation including a multi-circuit, direct-current generator which is designed particularly for such service, although certain features of the design may also be of some general utility in other more or less similar applications.

In the art of mechanical shovels, and similar excavating equipment, steam engines have heretofore enjoyed a very distinct advantage on account of their ability to stall easily without any damage to the equipment.

An electrical shovel equipment has heretofore been used, including a single main generator supplying the several motors which are required on the shovel, and utilizing rheostatic armature-circuit control, the armature rheostat or series resistance being utilized to permit the controlled motors to be frequently stalled. Such rheostatic control has been operated at a very serious disadvantage on account of the objectionably heavy losses in the rheostat, and also on account of the very material maintenance trouble occasioned by the rapid burning of the contacts which are utilized to open the heavy armature currents.

An electrical shovel equipment has also been used, utilizing variable-voltage control, which has necessitated a separate variable-voltage generator for each of the main motors utilized on the shovel. These equipments have been used with an electric motor for the prime-mover and with the main generators of the motor-generator sets mounted on the same shaft as the prime-mover. This has necessitated an auxiliary motor-generator set, mounted somewhere on the cab of the shovel, to provide the necessary exciting current. Where Diesel or gas engines are used as the prime-mover, there is no room for the above-mentioned separate variable-voltage generators of the main motor-generator sets, so that, at present, electric shovels utilizing such engines as prime-movers must utilize the old rheostatic control system. The reason for this will be understood from the following considerations.

It is the common practice to put the electrical power unit, comprising prime-mover and generators, crosswise of the shovel on the rear end of the cab, where it acts as a counterweight for the dipper on the front end. The center and front portions of the cab are occupied by the gearing, transformers and control equipment, so that a lengthwise disposition of the motor-generator set would enormously increase the length of the cab, thereby increasing the inertia of the swinging parts, and also increasing the clearance space required for the shovel to revolve, which would thereby make the shovel unable to meet the competition of shovels utilizing other equipments.

It will be seen, from the foregoing explanation, that the overall length of an electric power unit consisting of prime-mover, generator or generators, and exciter, is strictly limited to the transverse width of the cab of the shovel.

It is an object of my invention to provide a novel electrical plant including a multi-circuit direct-current generator, with independent reversible voltage control on each pair of poles, to supply the variable voltage for some or all of the motors utilized on an electric shovel, thereby making room for the utilization of a Diesel or gas engine, which is longer than an equivalent electric motor, and also making room for the mounting of an exciter on the same shaft as the main generator, particularly where motor drives are utilized, thereby eliminating the necessity for an auxiliary motor-generator exciter set.

A further object of my invention is to provide improvements in a multi-circuit generator which is utilized in the electric equipment of power shovels and draglines, said improvements embodying a special chording of the armature winding so as to prevent interaction between the different circuits of the generator, and a special application of a triple excitation system for each pair of poles of the multi-circuit generator, so that each pair of poles is energized by (1) an independently controlled and reversible separately excited winding energized from the exciter bus, (2) a self-excited winding energized from the two brushes which correspond to the said pair of poles, said self-excited winding producing a magnetomotive force assisting that of the separately excited winding; and (3) a differential series winding energized by the current flowing in the aforesaid two corresponding brushes. The triple excitation system just mentioned has the effect of limiting the stalling current to any desired value, such as 2½ times the full load current, and still retain the high full-load voltage of an ordinary shunt generator, so that the electrical equipment of the shovel will have the same characteristics, in this respect, as the antiquated rheostatically controlled equipment.

In multi-circuit generators such as are utilized in my equipment, the characteristic which limits the rating of the machine is the commutation, rather than the heating of the machine, because all of the circuits of the generator will not be loaded at once, and the armature can thus stand much heavier loading of any one pair of brushes, so far as the heating is concerned, than ordinary generators. The size of the generator is determined, therefore, by its commutating abilities, as it must be big enough to commutate the heaviest stalling current which is required. It is necessary, therefore, to provide some sort of interpolar commutating windings so as to compensate the commutating voltages as exactly as possible, and by no means should the voltage-drop from one side of a brush to the other side of the same exceed about two volts.

According to my invention, therefore, I provide a single interpole for each pair of main poles, said interpole being located between said main poles and carrying about six times the number of turns which would ordinarily be provided in a single-external-circuit machine which had two interpoles for each pair of main poles, so that all of the compensation of the currents in the coils undergoing commutation is produced by the single interpole winding. In this way, I am enabled to compensate the armature coils carrying the current of any pair of brushes, without affecting any other portions of the armature winding, particularly when this single-interpole compensating system is utilized in combination with the unusual chording of the armature winding previously mentioned.

With the foregoing and other objects in view, my invention consists in the apparatus, methods and systems hereinafter described and claimed and illustrated in the accompanying drawings.

Figure 1 is a plan view of the cab of an electric shovel embodying my invention;

Fig. 2 is a side elevational view of the shovel;

Fig. 3 is a wiring diagram illustrative of the principal features of the control of either the hoist motor, the swing motor or the thrust motor;

Figs. 4 and 5 are side elevational views of two different types of power units embodying my invention;

Fig. 6 is a partial development wiring diagram of a six-pole multiple-circuit generator of my invention;

Figs. 7 and 8 are curve diagrams, and

Fig. 9 is an end view of the stator member of the generator shown in Fig. 6, the field windings and their connections being indicated diagrammatically.

In Figs. 1 and 2 I have shown my invention applied to an electric shovel consisting of a transporting foundation 11, a revolving frame 12 carried thereby, a cab 13 carried by said frame, a boom 14 carried by the front end of the frame, a handle 15 carried by said boom, said handle having a rack 16 and being so mounted that it can be moved longitudinally and pivoted so as to swing up and down about a certain point 17 on said boom, and a dipper or other excavating and/or hoisting instrument 18 carried by said handle, as is usual in power shovels of the revolving type. It will thus be seen that such a shovel requires three principal motions; first, a hoist motion for raising and lowering the dipper 18 on the end of the handle 15, such movement being accomplished by means of a hoist rope 21 attached to the bail of the dipper 18 and passing over a sheave 23 at the end of the boom 14 to a drum 24 mounted in the cab, said drum being driven, through suitable gearing 25, from either a series direct-current hoist motor, or, as shown in the drawing, preferably a separately excited shunt direct-current hoist motor 26 which is mounted in the cab; second, a thrust or crowd motion for thrusting the handle 15 out and crowding the excavating instrument or dipper 18 against the material to be excavated, and for withdrawing the handle backwards, which is accomplished by means of a separately excited shunt direct-current thrust motor 28 which is mounted on the boom 14 and mechanically connected to operate on the rack 16 through suitable gearing 29; and third, a swing motion for swinging the entire revolving frame about a vertical pivot 31 on the foundation 11, said motion being accomplished, through suitable gearing 32, by means of a separately excited shunt direct-current swing motor 33 mounted in the cab near the front end thereof.

According to my invention, I provide a novel power unit 35 mounted transversely across the rear end of the cab 13 for energizing the three motors, namely, the hoist motor 26, the thrust motor 28 and the swing motor 33. The power supplying equipment shown in Fig. 1 is for a four-yard revolving-type shovel, and it comprises a prime-mover in the shape of a 250 horsepower induction motor 36 designed to operate on a 3-phase, 60-cycle, 2200-volt line, a direct-current 165 kw. hoist generator 37, a two-circuit generator 38 having two 40 kw. circuits for energizing the swing and thrust motors, respectively, and an exciter 39. In the form of my invention shown in Fig. 1, the field frames of my hoist generator 37 and my swing and thrust generator 38 are combined into one external supporting frame 40, said frame having two independent field magnet members, associated with two independent armatures, just as if the single surrounding frame had not been provided.

Before explaining my multi-circuit generator construction and the control system which is utilized for the several motors of the electric shovel, I wish to point out that I am by no means limited to the particular combination of parts shown in the power unit 35 of Fig. 1. This particular power unit is advantageous in view of the fact that it saved enough space, by utilizing a double-circuit generator 38 and by utilizing a common external field frame 40, thereby eliminating two end brackets, so that there was room for placing the exciter 39 on the same shaft as the induction motor 36, thereby eliminating the exciter motor-generator set which has previously been employed on electric shovels, and saving space and wiring.

However, other power units may be employed. Thus, Fig. 4 shows a power unit 35ª consisting, by way of illustration, of a Diesel engine 41 driving a three-circuit generator 42 and an exciter 39ª. In this case, the three-circuit generator 42 supplies electrical energy for the armatures for all three of the motors, namely, the hoist motor 26, the thrust motor 28 and the swing motor 33.

A still further variation in the power unit is indicated, by way of example, in Fig. 5, which shows a power unit 35ᵇ comprising a synchronous motor 44 serving as a prime-mover driving a hoist generator 37ᵇ and a three-circuit generator 38ᵇ, the latter being utilized to provide the swinging motor circuit, the thrust motor circuit and the exciter circuit, thereby eliminating the necessity for a separate exciter.

Other variations of multiple-circuit generators for electric shovel application will suggest themselves, such as, utilizing a four or five-circuit generator for supplying independently controllable voltages for four or five circuits, which may include the exciter circuit and/or two separate hoist motors driving the same hoisting load, as the energy for supplying the hoist motion is usually several times larger than the energy for any of the other circuits.

The design of my multi-circuit generator is illustrated in detail in connection with the three-circuit generator 42 of the combination shown in Fig. 4. As the same design-principles apply to all of my multi-circuit generators, it is believed that a single description will suffice for all, with the explanation that, in general, it will probably be best to have as many independent generator circuits as there are pairs of main poles.

The detailed construction of a six-pole, three-circuit generator 42 is shown in Figs. 6 and 9, and the armature and field connections for one of its circuits is illustrated in Fig. 3, the other circuits being omitted because they are, or may be, identical with the one which is shown.

As shown in Fig. 9, the three-circuit generator 42 has six main poles 51 and three interpoles 52. The machine is provided with a commutator 53 on which there are three pairs of brushes 54 and 55, corresponding to pairs of adjacent main poles 51. By the term "brush", in this specification and in the appended claims, I mean to include the brush or brushes which is or are mounted on a single brush-arm.

The machine is provided with an armature 56 having a multiple-circuit winding 57, which is described by some authors as a lap-wound armature, but which is of unusual construction, not only because it is a multiple-wound armature which is in itself unusal, as compared to the two-circuit armature, sometimes called a wave-wound armature, which is utilized in 90% of all direct-current generators, in fact, in nearly all direct-current generators, particularly in the smaller and medium sizes, except very special heavy-current low-voltage machines, but my winding is unusual in the extent to which it is chorded, as will subsequently be explained, and also in its omission of the cross connections or equalizer connections which have been a standard part of multiple-circuit armature since 1896, when the Lamme Patent 573,009 was issued. These equalizer connections are needed, in a single-circuit machine having a multiple-wound armature, in order to prevent the circulation of large currents through the brushes, which would produce very poor commutation, said circulating currents being inevitable on account of slight differences of electromotive forces which will always be encountered in different portions of the armature circuit. In my multi-circuit generator, however, where the several pairs of brushes are not connected, as in an ordinary single-circuit generator having a multiple-wound armature, there is no occasion for circulating currents, and hence the equalizer connections are not only not necessary, but would defeat the purpose of the three separate load circuits connected to the three pairs of brushes, because such equalizer connections, or armature cross connections, would produce, or tend to produce, equal voltage in all portions of the armature winding.

As shown more particularly in Fig. 6, wherein one third of the armature is shown in development, my armature winding 57 is chorded to a pitch which is at least one full slot less than full pitch, the winding shown in Fig. 6 being exactly one full slot less than full pitch. Thus, the tooth between slots 13 and 14 in Fig. 6 is under the center of the interpole 52, in the position shown in Fig. 6. The conductors lying in the top of slot 13 are connected to commutator bars 2, 3 and 4 under the negative brush 55, and the conductors lying in the bottom of slot 14 are connected to commutator bars 40, 41 and 42 lying under the positive brush 54. The entire machine has six main poles 51, 78 armature slots and 234 commutator bars. One pole pitch is 78/6 or 13 slots. The pitch of the winding is 12 slots, or one slot less than full pole pitch. Thus, the sides of the coil which are attached to commutator bars 1 and 2 are in slots 1 and 13, respectively, giving a coil pitch of 13 minus 1, or 12.

As a result of this chording of the armature winding, it will be evident that the single interpole 52, which is located between the two main poles of each pair, produces the necessary commutating voltage in one coil-side of each of the coils being commutated, at any moment, by the two brushes 54 and 55. The other coil-side of each coil which is being commutated lies in a region in which there is no interpole and hence no commutating voltage generated, so that the full voltage necessary for commutating purposes must be generated by the single interpole 52, which consequently has about six times as many turns in its interpole winding 61 as in an ordinary single-external-circuit direct-current machine having as many interpoles as main poles. The commutating zone is indicated approximately by the arrows 62 under the interpole 52.

By omitting the interpoles on each side of each pair of main poles, I avoid having any interpole winding 61 affect any armature coils except those which are being commutated by the two brushes 54 and 55 of its own individual circuit. Also, by making the armature winding 57 one full slot less (or more) than a pole pitch, I produce the further advantage of preventing the coils which are undergoing commutation under one pair of brushes from introducing electro-motive forces in coils which may be undergoing commutation in the next adjacent brush of another circuit, which would be the case if the coils undergoing commutation in the two circuits had coil sides lying in a common slot.

The particular machine shown in Figs. 3, 6 and 9 is designed to have its three circuits connected, respectively, to the hoist motor armature, the swing motor armature and the thrust motor armature, as indicated in Fig. 9. This particular machine was designed to have the same no-load voltage in each of the three circuits, but a much lower stalling current in the swing and thrust motors than in the hoist motor circuit, because of the much larger size of the hoist motor. The field windings of the particular machine in question include 42½ turns on all three of the interpoles 52, a separately excited field coil 64 of 950 turns or 2250 no-load ampere turns on each of the six main poles 51, a self-excited shunt field coil 65 of 2600 turns or 3250 no-load ampere turns on each of the six main poles 51, a series differential field coil 66 of 10½ turns on each of the two main poles 51 of the hoist motor circuit, and a series differential field coil 67 of 26½ turns on the main field poles 51 of each of the other two circuits, leading to the swing motor and the thrust motor, respectively. The larger number of series differential turns on the main poles of the swing and thrust motor circuits of the generator 42 is needed in order that the magnetomotive forces of the corresponding self and separately excited shunt windings may be neutralized at a much lower maximum armature current than in the case of the hoist motor circuit, which requires a much higher stalling current. This action will be more fully explained hereinafter.

The field windings on each pair of main poles 51 are treated as a unit, for independent voltage control on each of the three circuits of the multi-circuit generator, and as the three control systems are similar, a description of one will suffice for all. The separately excited windings 64 of each pole pair are wound for 70-volt excitation and are energized from a 125-volt exciter bus 70, the difference in voltage being taken up by a permanently connected series resistance 71, which speeds up the rate of response of the machine upon the application of the excitation. The self-excited windings 65 are wound for 200-volt excitation and are connected across the corresponding brushes 54 and 55, which have a no-load armature voltage of 450 volts, the difference in voltage being taken up by a series resistor 72 which is permanently connected in series with the separately excited coils. The series differential coils 66 and 67 are usually shunted by resistors 73 which are utilized for the purpose of making an exact adjustment of the differential series-winding effect.

The control circuit, as more clearly shown in Fig. 3, comprises a controller 75 for energizing the separately excited windings 64 in either direction and in varying amounts. The controller is preferably arranged with auxiliary contacts 79 for short circuiting an extra resistance 80 whenever the separately excited windings 64 are energized and reinsert said extra resistance in its circuit whenever the separately excited windings are deenergized. This extra resistance 80, when used, is connected in series with the self-excited coils 65. The reason for this is that the strength of the self-excited coils is almost, but not quite, sufficient, without the separately excited coils, to cause the corresponding generator brushes 54 and 55 to build up their voltage, with the armature of the hoist motor 26 connected in series with the generator armature circuit. When the separately excited coils are deenergized, in order to stop the hoist motor 26, the corresponding generator voltage would usually die down a little slower than is desirable, if the nearly sufficient self-excited magnetization were not reduced, and hence the extra resistance 80 is inserted. It is not desirable to entirely open-circuit the self-excited windings, because then the generator voltage would be reduced too rapidly, causing the flow of excessive regenerative braking currents. The hoist motor 26 has a separately excited field winding 82 which is constantly energized from the exciter bus 70. It will be understood, of course, that the strength of this separate excitation of the hoist motor may also be varied, as a part of the control scheme, in accordance with a well-known control method which is not a part of my invention and is not illustrated, in order to avoid complication of the diagram.

Figs. 7 and 8 illustrate the effect of the three-winding excitation, utilizing self-excited windings, as well as separately excited windings and series differential windings. If the self-excited windings were omitted, the generator voltage and power (or kw. output) would vary, as indicated by curves 91 and 92 in Fig. 7. In this case, in order to limit the stalling current to a reasonable value compared with the full load current, it would be necessary to operate, at full load, at a voltage very considerably less than the no-load voltage, because of the extremely drooping voltage characteristic.

When all three exciting windings are utilized, the self-excited windings serve to hold up the voltage and consequently the kw. output of the circuit, particularly up to about ⅔ or ¾ of the maximum stalling current, as shown by the curves 93 and 94, respectively, in Fig. 8, so that a very slight increase in current beyond the normal operating range will cause the motor to stall by reason of the dropping off of the generator voltage.

While I have illustrated my invention primarily in connection with electric shovels of the revolving type, it is to be understood that the invention is also applicable to draglines, in which there are only the hoist and swing motions, without the trust motion, and it is also applicable to other machines having parts which are required to be moved in such manner that they may be frequently stalled without damage. Some features of my invention may also be useful in still other applications, and I do not desire to have the appended claims limited to any particular design or application except as may be required by the language of the respective claims and the prior art.

I claim as my invention:

1. In a machine having a hoist motion and a swing motion, a direct-current electric motor for each of these motions, in combination with a prime-mover and a multi-circuit multi-polar direct-current generator mechanically connected together and mounted upon the swinging part of said machine, said generator having a multiple-wound armature without cross-connections, and having a plurality of pairs of main field poles, and having a plurality of circuits taken off from said armature, means for independently varying the direction and the magnitude of the excitation of the poles corresponding to at least some of said circuits, and means for constantly connecting the armature of at least one of said motors across at least one of said circuits, characterized by the fact that the armature winding is chorded to a pitch which is at least one full slot different from full pitch.

2. In a machine having a hoist motion and a swing motion, a direct-current electric motor for each of these motions, in combination with a prime-mover and a multi-circuit multipolar direct-current generator mechanically connected together and mounted upon the swinging part of said machine, said generator having a multiple-wound armature without cross-connections, and having a plurality of pairs of main field poles, and having a plurality of circuits taken off from said armature, means for independently varying the direction and the magnitude of the excitation of the poles corresponding to at least some of said circuits, and means for constantly connecting the armatures of said motors across two circuits of said generator, respectively, characterized by the fact that the armature winding is chorded to a pitch which is at least one full slot different from full pitch, and further characterized by the fact that said generator has one and only one interpole per pair of main poles for at least some of the pairs of main poles.

3. In a machine having a hoist motion, a swing motion and a thrust motion, a direct-current electric motor for each of these motions, in combination with a prime-mover and a multi-circuit multipolar direct-current generator mechanically connected together and mounted upon the swinging part of said machine, said generator having a multiple-wound armature without cross-connections, and having a plurality of pairs of main field poles, and having a plurality of circuits taken off from said armature, means for independently varying the direction and the magnitude of the excitation of the poles corresponding to at least some of said circuits, and means for constantly connecting the armatures of a plurality of said motors across a plurality of circuits of said generator, respectively, characterized by the fact that the armature winding is chorded to a pitch which is at least one full slot different from full pitch.

4. A multi-circuit multipolar direct-current generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits.

5. A multi-circuit multipolar direct-current generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits, characterized by the fact that a pair of main field poles of the generator, corresponding to an independently variable circuit, has separately excited windings, self-excited windings assisting said separately excited windings, and differential series windings.

6. A multi-circuit multipolar direct-current generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits, characterized by the fact that a pair of main field poles of the generator, corresponding to an independently variable circuit, has separately excited windings, self-excited windings assisting said separately excited windings, and differential series windings, the self-excited windings of said pair of poles having insufficient strength, when the corresponding separately excited windings are deenergized, to maintain or to build up the excitation of that pair of poles.

7. A multi-circuit multipolar direct-current generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits, characterized by the fact that a pair of main field poles of the generator, corresponding to an independently variable circuit, has separately excited windings, self-excited windings assisting said separately excited windings, and differential series windings, and further characterized by means for introducing resistance in series with the self-excited windings of said pair of poles whenever its corresponding separately excited windings are deenergized, whereby the voltage across the corresponding pair of brushes will die out at a predetermined rate.

8. A multi-circuit multipolar direct-current generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits, characterized by the fact that the armature winding is chorded to a pitch which is at least one full slot different from full pitch.

9. A multi-circuit multipolar direct-current generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits, characterized by the fact that the armature winding is chorded to a pitch which is at least one full slot different from full pitch, and further characterized by the fact that a pair of main field poles of the generator, corresponding to an independently variable circuit, has separately excited windings, self-excited windings assisting said separately excited windings, and differential series windings.

10. In an excavating and/or hoisting machine having a hoist motion and a swing motion, a direct-current electric motor for each of these motions, in combination with a prime-mover and a multi-circuit multipolar direct-current generator mechanically connected together and mounted upon the swinging part of said machine, said generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits, characterized by the fact that the armature winding is chorded to a pitch which is at least one full slot different from full pitch, and further characterized by the fact that a pair of main field poles of the generator, corresponding to an independently variable circuit, has separately excited windings, self-excited windings assisting said separately excited windings, and differential series windings, and means for constantly connecting the armature of at least one of said motors across at least one of said circuits.

11. In a machine having a hoist motion and a swing motion, a direct-current electric motor for each of these motions, in combination with a prime-mover and a multi-circuit multipolar direct-current generator mechanically connected together and mounted upon the swinging part of said machine, said generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits, and means for constantly connecting the armature of at least one of said motors across at least one of said circuits.

12. In a machine having a hoist motion and a swing motion, a direct-current electric motor for each of these motions, in combination with a prime-mover and a multi-circuit multipolar direct-current generator mechanically connected together and mounted upon the swinging part of said machine, said generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature and means for independently varying the direction and the magnitude of the excitation of the poles corresponding to at least some of said circuits, and means for constantly connecting the armatures of said motors across two circuits of said generator, respectively.

13. In an electric shovel having a hoist motion, a swing motion, and a thrust motion, a direct-current electric motor for each of these motions, in combination with a prime-mover and a multi-circuit multipolar direct-current generator mechanically connected together and mounted upon the swinging part of said shovel, said generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits, and means for constantly connecting the armature of at least one of said motors across at least one of said circuits.

14. In an electric shovel having a hoist motion, a swing motion, and a thrust motion, a direct-current electric motor for each of these motions, in combination with a prime-mover and a multi-circuit multipolar direct-current generator mechanically connected together and mounted upon the swinging part of said shovel, said generator having a multiple-wound armature without cross-connections, and having a plurality of pairs of main field poles, and having as many brushes as main field poles and having one and only one interpole per pair of main poles for at least some of said pairs of main poles, said generator having a plurality of circuits taken off from said armature, and means for independently varying the direction and the magnitude of the excitation of the poles corresponding to at least some of said circuits, and means for constantly connecting the armatures of a plurality of said motors across a plurality of circuits of said generator, respectively.

15. In an electrical power unit, the combination including a multi-circuit multipolar direct-current generator, and a plurality of load-elements connected across a plurality of the generator-circuits, respectively, at least one of said load-elements comprising a separately excited motor having an armature permanently connected across its generator-circuit, characterized by said generator having a multiple-wound armature without cross-connections, and having a plurality of pairs of main field poles, and having as many brushes as main field poles and having one and only one interpole per pair of main poles for at least some of said pairs of main poles, and means for independently varying the direction and the magnitude of the excitation of the poles corresponding to at least some of said circuits.

16. In a machine having a hoist motion and a swing motion, a direct-current electric motor for each of these motions, in combination with a prime-mover and a multi-circuit multipolar direct-current generator mechanically connected together and mounted upon the swinging part of said machine, said generator having a multiple-wound armature without cross-connections, and having a plurality of pairs of main field poles, and having as many brushes as main field poles, said generator having a plurality of circuits taken off from said armature, and means for independently varying the direction and the magnitude of the excitation of the poles corresponding to at least some of said circuits, and means for constantly connecting the armature of at least one of said motors across at least one of said circuits.

17. In a machine having a hoist motion and a swing motion, a direct-current electric motor for each of these motions, in combination with a prime-mover and a multi-circuit multipolar direct-current generator mechanically connected together and mounted upon the swinging part of said machine, said generator having a multiple-wound armature without cross-connections, and having a plurality of pairs of main field poles, and having as many brushes as main field poles, said generator having a plurality of circuits taken off from said armature, and means for independently varying the direction and the magnitude of the excitation of the poles corresponding to at least some of said circuits, and means for constantly connecting the armatures of said motors across two circuits of said generator, respectively.

18. In an electric shovel having a hoist motion, a swing motion, and a thrust motion, a direct-current electric motor for each of these motions, in combination with a prime-mover and a multi-circuit multipolar direct-current generator mechanically connected together and mounted upon the swinging part of said shovel, said generator having a multiple-wound armature without cross-connections, and having a plurality of pairs of main field poles, and having as many brushes as main field poles, said generator having a plurality of circuits taken off from said armature, and means for independently varying the direction and the magnitude of the excitation of the poles corresponding to at least some of said circuits, and means for constantly connecting the armature of at least one of said motors across at least one of said circuits.

19. In an electric shovel having a hoist motion, a swing motion, and a thrust motion, a direct-current electric motor for each of these motions, in combination with a prime-mover and a multi-circuit multipolar direct-current generator mechanically connected together and mounted upon the swinging part of said shovel, said generator having a multiple-wound armature without cross-connections, and having a plurality of pairs of main field poles, and having as many brushes as main field poles, said generator having a plurality of circuits taken off from said armature, and means for independently varying the direction and the magnitude of the excitation of the poles corresponding to at least some of said circuits, and means for constantly connecting the armatures of a plurality of said motors across a plurality of circuits of said generator, respectively.

20. In an electrical power unit, the combination including a multi-circuit multipolar direct-current generator, and a plurality of load-elements connected across a plurality of the generator-circuits, respectively, at least one of said load-elements comprising a separately excited motor having an armature permanently connected across its generator-circuit, characterized by said generator having a multiple-wound armature without cross-connections, and having a plurality of pairs of main field poles, and having as many brushes as main field poles, said generator having a plurality of circuits taken off from said armature, and means for independently varying the direction and the magnitude of the excitation of the poles corresponding to at least some of said circuits.

CLARENCE B. HATHAWAY.